Oct. 11, 1949.   H. A. HERZIG   2,484,225
METHOD OF INCORPORATING LIGHT SEALING MATERIAL
IN FILM CARTRIDGE DURING MOLDING
Filed June 6, 1947
Fig. I.
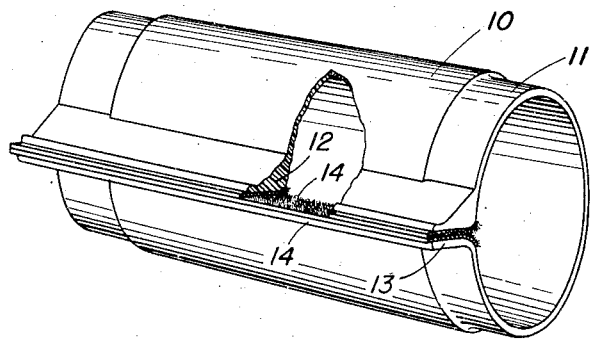
Fig. 2.   Fig. 3.
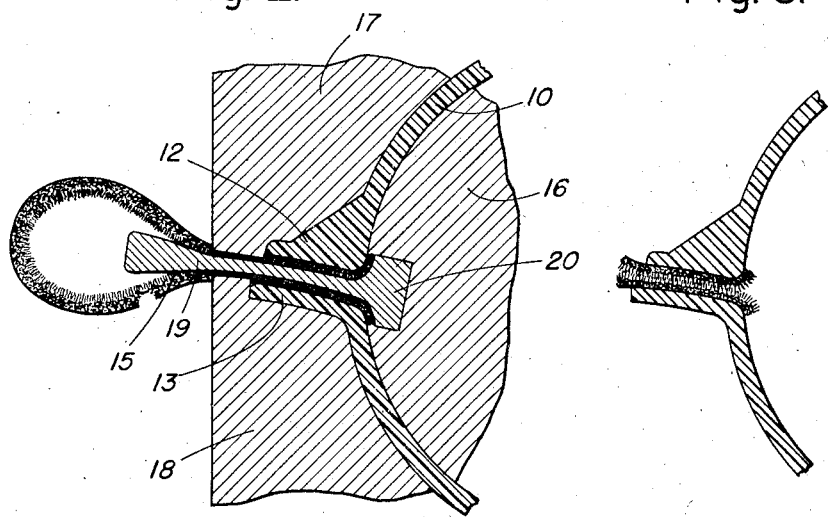
INVENTOR.
Henry A. Herzig
BY
Attorneys Patented Oct. 11, 1949

2,484,225

UNITED STATES PATENT OFFICE 2,484,225

METHOD OF INCORPORATING LIGHT SEALING MATERIAL IN FILM CARTRIDGE DURING MOLDING

Henry Alfred Herzig, Binghamton, N. Y., assignor to General Aniline & Film Corporation, New York, N. Y., a corporation of Delaware Application June 6, 1947, Serial No. 752,890

2 Claims. (Cl. 18—59)

This application pertains to an invention in a method of molding film cartridges such as the commonly employed 35 mm. cartridges for still cameras. The invention is more specifically concerned with certain improvements in molding such cartridges according to which light excluding material for the cartridge film slot is inserted at the time the cartridge shell itself is molded and is bonded to the proper surfaces of the cartridge during the molding operation.

Among the objects of the invention is that of eliminating various hand operations heretofore deemed necessary and which involved gluing or otherwise adhering a light excluding material to the film slot of a cartridge after the cartridge has been molded or otherwise fabricated.

Another object of the invention is that of molding a cartridge shell in a more or less conventional manner but in so modifying the mold and the method that the light excluding material, such as velvet or plush, is attached or bonded to the proper surfaces during the molding operation.

A further object of the invention is that of incorporating the light excluding material in a film cartridge without resort to additional steps after the cartridge is molded and removed from the mold other than that of shearing off or trimming an excess of the light excluding material itself.

Other objects will become evident from the following description of the invention in which one specific method is described in greater detail.

According to the invention, during the molding of a plastic or other film cartridge, the mold is so designed and manipulated that the light excluding material, such as plush or velvet, is held at the appropriate position so that as the film slot of the cartridge shell is formed, the said light excluding material will lie between the opposite portions of that film slot. A special mandrel is employed at that time to position the light excluding material and to maintain the opposed parts thereof in properly spaced relation. After the material has hardened, it may be withdrawn from the mold and such excess light excluding material as extends beyond the film slot is then removed by trimming with a sharp instrument.

In contrast to the conventional practice according to which the usual plush material is glued or otherwise adhered to the film slot of the cartridge, the present method makes the use of glue or cement unnecessary and, of course, makes unnecessary considerable hand work. It is of decided advantage to have the light excluding material incorporated during production of plastic or other molded cartridges since the film slot therein cannot be opened to the extent which sheet metal slots may be, so that the gluing of the material to these molded cartridge shells is more difficult. The plastic material injected while in a fluid but relatively viscous state enters into the woven or other backing structure for the plush and suitably attaches itself to that material, although it does not extend through into the pile of the fabric, that actually being the part thereof which cooperates in engagement with the film to exclude light.

The invention will hereinafter be described by reference to the accompanying figures of drawing, in which:

Fig. 1 is a perspective of a molded cartridge shell to which plush light excluding members have been applied in accordance with the invention.

Fig. 2 is a fragmentary view in section showing parts of the mold and the manner in which the light excluding material is held in position between the mold parts so as to be incorporated at the light slot during the molding operation.

Fig. 3 is a section of the cartridge shell showing the light excluding material after the excess has been trimmed and illustrating the manner in which the fabric is held by the plastic material and the manner in which the plush is interengaged to permit passage of film but to exclude light from the interior of the enclosure.

Referring to Fig. 1 the invention may be applied to all cartridges or other film containers of similar nature which are molded and during the molding of which the conventional plush or velvet or other pile fabric may be inserted within the mold itself. Preferably, the cartridge should be fabricated from some material, such as any one of the well known phenolic resins or urea formaldehydes, from which cartridges are frequently made and which is injected under pressure. However, the invention is not limited to any particular material or materials so long as the molding temperatures are not excessive and so long as the necessary pressures do not reach a point which would tend to destroy the light excluding material. Temperatures may run relatively high, however, since during the molding operation there is insufficient oxygen present to support combustion and, therefore, there is little danger of burning the fabric.

A shell 10 is generally molded in cylindrical shape having reduced ends 11 over which end caps may be fitted to render the entire structure light tight. These end caps are well known in the art and need not be specifically described or illustrated here. The shell has a film slot formed between the projecting lips 12 and 13, this film slot being for the purpose of permitting withdrawal of the film for threading purposes and for exposure. After exposure of the intended portion of the film, it is generally rewound or drawn back into the cartridge. In order to render the film slot light tight and to provide a suitable guide means which will prevent scratching or other damage to the film, fabric 14 is applied to both the interior surfaces of the slot, that having been accomplished heretofore as a separate and independent operation after the cartridge shell has been removed from the mold or otherwise fabricated. The fabric 14 is usually a plush or velvet type material having a woven backing from which project tufts or pile of sufficient density to block off the slot and thereby to prevent light from passing into the cartridge.

Instead of cementing or gluing strips to the proper surfaces at the film slot, according to the present invention a loop of plush material designated by numeral 15, Fig. 2, is positioned within the mold prior to injecting. While the mold may take any convenient form according to the particular molding technique employed, for purposes of description it may be considered to have an interior cylindrical core 16 and outer parts 17 and 18 adapted to be closed about the core 16 and also about a mandrel 19. This mandrel 19 is preferably of thin cross-section, especially at the part thereof which lies intermediate the mold cavities within which are to be formed the film slot components. At the interior of the mold, the mandrel flares out as at 20 and the flared portion fits into a corresponding recess in the core 16, that serving to position the mandrel and also to provide for curving the ends of the plush material interiorly of the cartridge as illustrated. The opposed mold parts 17 and 18 compress rather tightly against the plush adjacent the mandrel and beyond the film slot components so as to prevent any leakage or flow of the plastic or other molded material beyond the point intended.

Upon separation of the mold parts, the shell 10 may be withdrawn along with the light excluding plush material of which there is an excess in the nature of the extending loop. That loop may be sheared off close to or reasonably close to the ends of the slot, that being a relatively simple matter and not requiring skill or an appreciable amount of manual labor.

The injection of the viscous plastic under pressure causes it to enter the interstices of the backing portion of the fabric, and it has been found that the entry of the plastic material into the fabric is sufficient to prevent detachment of the fabric from the slot by any normal action or forces to which it may be subjected during its intended use.

In Fig. 3, the specific characteristics of the finished slot and the fabric therein is illustrated. It should be understood that the invention has been described by reference to molding one particular type of cartridge and that the shape of the film slot may be altered materially, and the extent of the light excluding material and of the portions of the shell to which it applies may also be varied within limits.

While it is more convenient to employ a fabric strip folded or looped inwardly upon itself, two narrow strips may be used instead. The fabric may be inserted in the mold by hand or may be automatically positioned. The mold itself may be so constructed as to trim or cut the fabric to an appropriate size after it has once reached its final position relative to the core and mandrel. For that purpose the outer elements of the mold may be formed as shears.

If, upon withdrawal from the mold the fabric has been compressed to the point where the pile has been flattened or compacted to render it less effective, it may be restored by use of a small hand napping tool.

While one embodiment of the invention has been disclosed, it is to be understood that the inventive concept may be carried out in a number of ways. This application is, therefore, not to be limited to the precise details described, but is intended to cover all variations and modifications thereof falling within the spirit of the invention and the scope of the claims.

I claim:

1. A method of incorporating light excluding material at the film slot of a film cartridge during molding which includes the steps of folding a loop of light excluding plush fabric about a supporting mandrel, inserting the mandrel and fabric in a mold in such position that the said fabric will separate the two opposed inner faces of a molded film slot, then introducing a fluid molding compound into the mold under a pressure sufficient to force the compound into a portion of the back of the plush material thereby to form a retaining bond between the molded slot and the light excluding material, then removing the cartridge from the mold and supporting mandrel and trimming that excess of fabric which extends beyond the film slot.

2. A method of incorporating light excluding material at the film slot of a film cartridge during molding which includes the steps of folding a loop of light excluding plush fabric about a supporting mandrel with the pile of the fabric facing inwardly toward the mandrel, inserting the mandrel and fabric in the mold in such position that the said fabric when subjected to the pressure of the molding compound will define the two opposed inner faces of a molded film slot, then introducing a fluid molding compound into the mold under a pressure sufficient to force the compound into a portion of the back of the plush material thereby to form a retaining bond between the molded slot faces and the light excluding material, then removing the cartridge from the mold and supporting mandrel and trimming the excess fabric which extends beyond the film slot.

HENRY ALFRED HERZIG.

REFERENCES CITED

The following references are of record in the file of this patent:

UNITED STATES PATENTS

| Number | Name | Date |
| --- | --- | --- |
| 2,004,959 | Morin | June 18, 1935 |
| 2,074,368 | Corner | Mar. 23, 1937 |
| 2,400,024 | Roehrl | May 7, 1946 |